United States Patent [19]

LaVars et al.

[11] Patent Number: 5,042,637
[45] Date of Patent: Aug. 27, 1991

[54] CONVEYOR DISCHARGE APPARATUS AND METHOD

[75] Inventors: Everett LaVars, Pomona; Jerry Cramer, Upland, both of Calif.

[73] Assignee: Sunkist Growers, Inc., Ontario, Calif.

[21] Appl. No.: 490,837

[22] Filed: Mar. 8, 1990

[51] Int. Cl.5 .............................. B65G 29/00
[52] U.S. Cl. .................. 198/372; 209/587; 209/652; 198/482.1; 198/483.1
[58] Field of Search ............... 198/483.1, 482.1, 469.1, 198/372; 209/580, 587, 651, 652, 912

[56] References Cited

U.S. PATENT DOCUMENTS

| | | |
|---|---|---|
| 1,903,835 | 4/1933 | Olson . |
| 2,529,081 | 11/1950 | Hughes et al. ............ 209/652 |
| 3,146,874 | 9/1956 | McGow et al. ............ 198/38 |
| 3,581,891 | 6/1971 | Rysti ............... 209/74 |
| 3,768,645 | 10/1973 | Conway et al. ........... 209/912 X |
| 3,907,112 | 9/1975 | Shepovalov et al. ........ 209/121 |
| 4,106,628 | 8/1978 | Warkentin et al. ......... 209/74 |
| 4,358,009 | 11/1982 | Rysti ............... 198/365 |
| 4,489,822 | 12/1984 | Hiebert ............. 198/478 |
| 4,569,434 | 2/1986 | Horii ............... 198/365 |
| 4,595,091 | 6/1986 | Scopatz et al. ........... 198/372 |
| 4,957,619 | 9/1990 | Powell ............ 209/912 X |

FOREIGN PATENT DOCUMENTS

| | | |
|---|---|---|
| 345036 | 12/1989 | European Pat. Off. . |
| 214349 | 2/1985 | United Kingdom . |
| 217435 | 11/1986 | United Kingdom . |
| 89/00390 | 9/1989 | World Int. Prop. O. . |

*Primary Examiner*—Joseph E. Valenza
*Assistant Examiner*—Keith L. Dixon
*Attorney, Agent, or Firm*—Pretty, Schroeder, Brueggemann & Clark

[57] ABSTRACT

A conveyor discharge apparatus, and a related method of operation, that can lift and thereby eject any article carried by a conveyor of the apparatus through substantially relying on the motor that advances the conveyor of the apparatus. The apparatus includes an ejection mechanism having a plurality of ejection fingers that are each associated with a separate one of the pockets of the conveyor and are selectively movable between rest and ejection positions so as to lift and eject articles carried by the pocket in which the particular finger is located. The ejection mechanism is further configured such that the power required to lift and eject any article from the pockets is provided substantially by the motor that advances the conveyor. In operation, the conveyor is advanced via the motor and the fingers are selectively moved substantially via the power of the motor from their respective rest positions to their respective ejection positions.

2 Claims, 2 Drawing Sheets

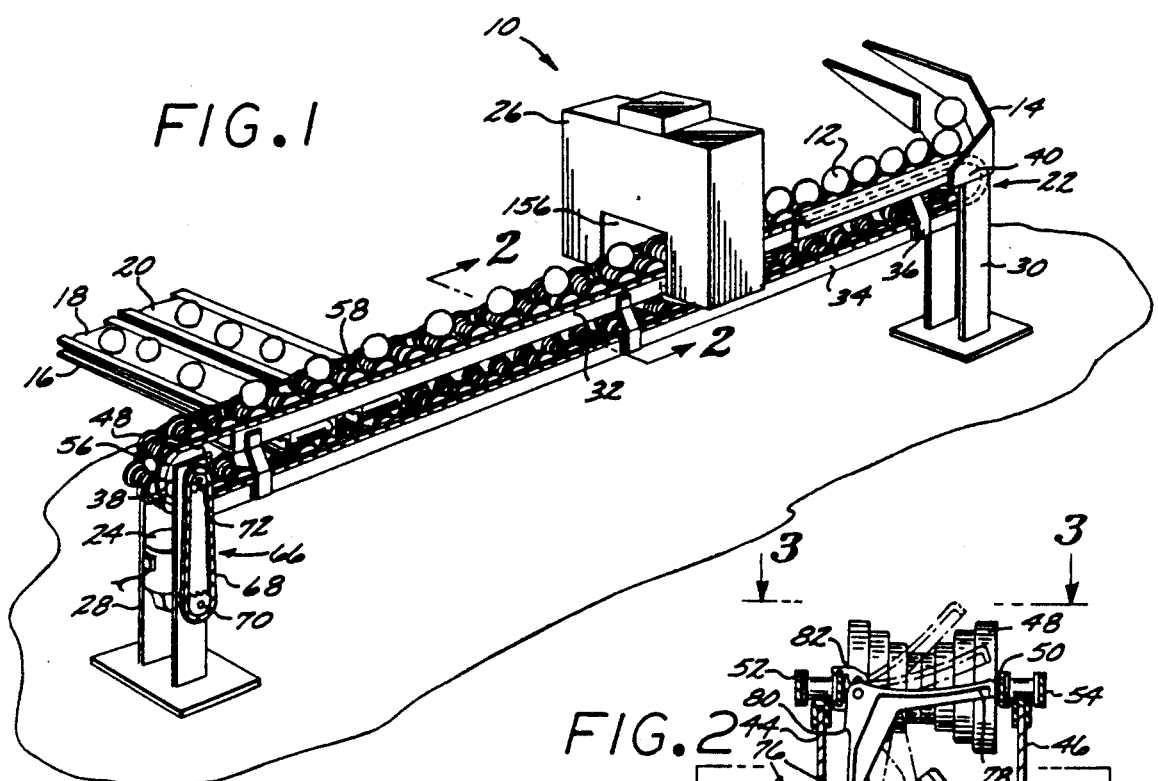
FIG. 1
FIG. 2
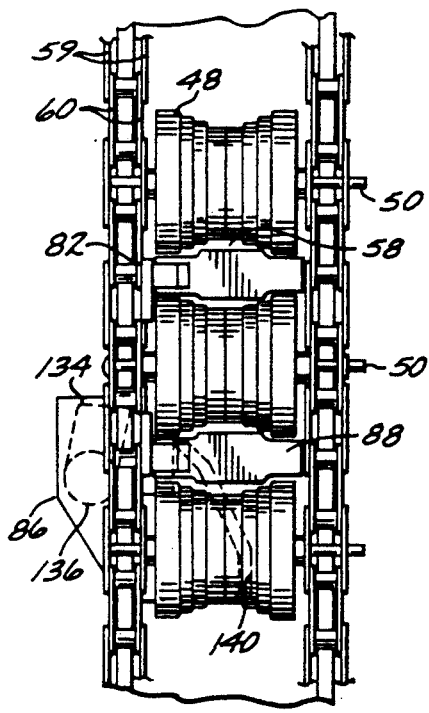
FIG. 3
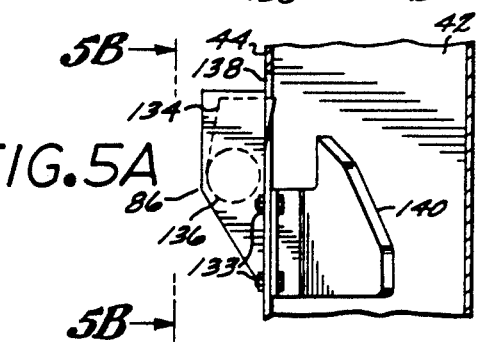
FIG. 5A
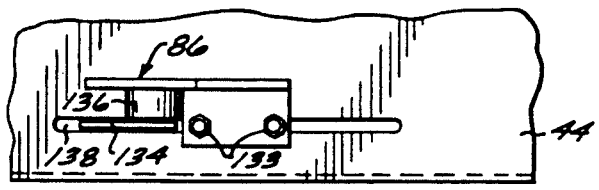
FIG. 5B
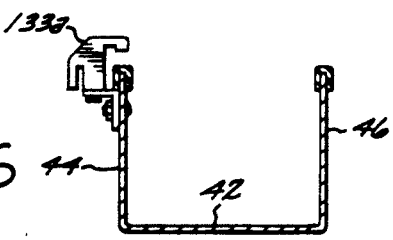
FIG. 6

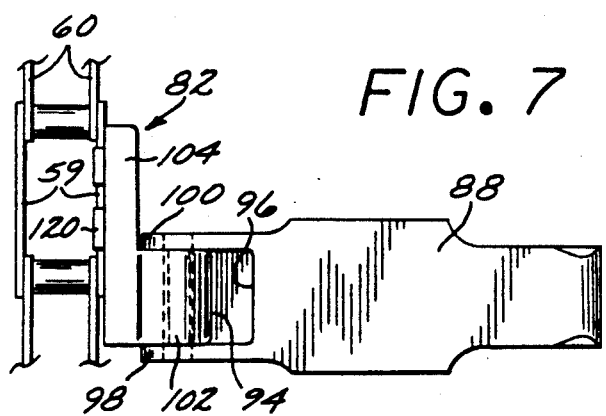
FIG. 7
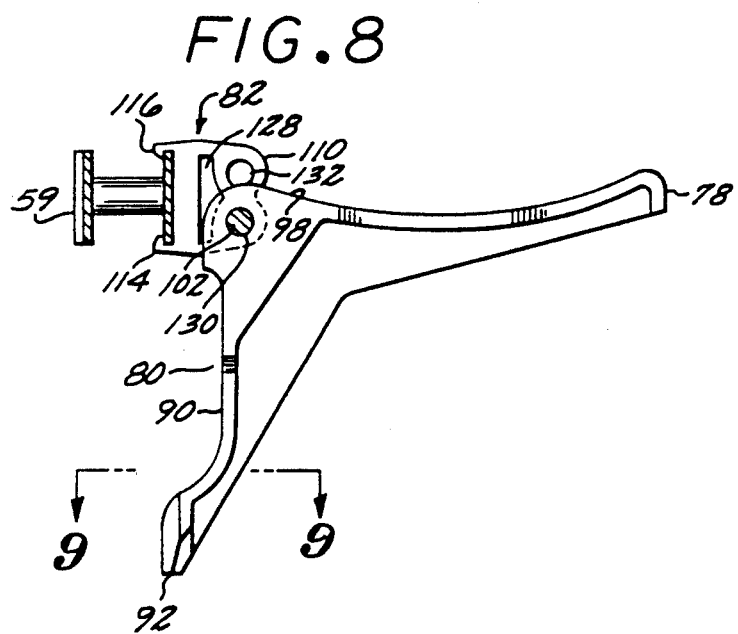
FIG. 8
FIG. 9
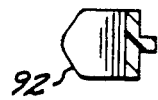
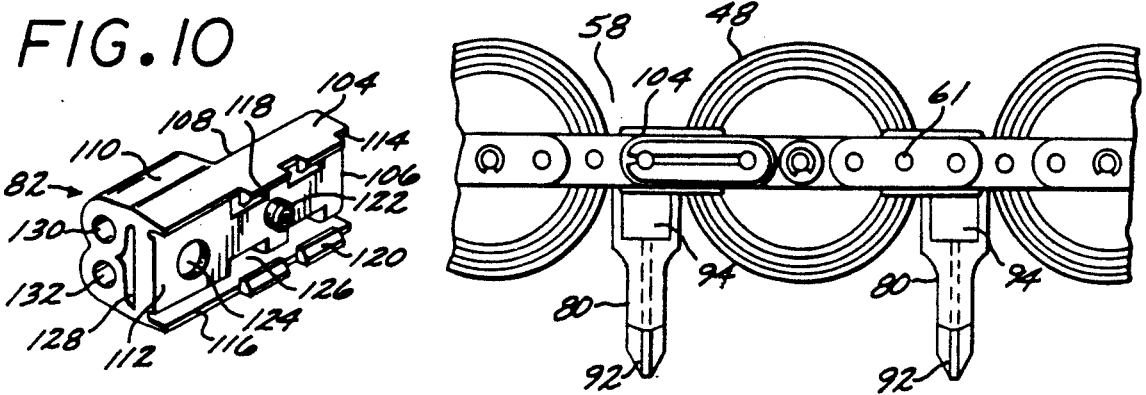
FIG. 10
FIG. 4

CONVEYOR DISCHARGE APPARATUS AND METHOD

BACKGROUND OF THE INVENTION

This invention relates generally to conveyor discharge apparatus for ejecting articles, such as fruit and vegetables, and, more particularly, to a conveyor discharge apparatus which selectively ejects articles from a conveyor onto selected underlying cross-conveyors.

Conveyor discharge apparatus have widespread and well-acknowledged industrial application, particularly because they significantly facilitate massive sorting, packaging, collection, organization or grading of articles. A variety of conveyor discharge apparatus which fulfill one or more of these purposes are known. By way of example only, they are heavily used in the fresh fruit industry where efficient and cost-effective sorting and grading of fruit is of paramount concern. One form of such apparatus is depicted in U.S. Pat. No. 4,595,091 to Scopatz et al. It describes a fruit sorting apparatus which selectively deflects articles from the conveyor such that they drop onto selected underlying cross-conveyors. A separate solenoid-controlled, piston-actuated diverter is provided to selectively push fruit laterally off the conveyor for each cross conveyor.

While apparatus of this nature do tend to sort and eject fruit relatively quickly and in large quantities, they have disadvantages. A separate power source is required to actuate each diverter. This tends to increase the cost of fruit sorting, since it necessitates a rather large sized solenoid and piston to provide the necessary power to eject the fruit from the conveyor. Each separate power source of this nature also tends to impart an overly abrupt and excessive force to the fruit. Consequently, the fruit may be damaged.

By way of further example, conveyor discharge apparatus are also used for the purpose of classifying eggs into weight categories. In one such application, pneumatically actuated devices deflect individual cups carrying eggs such that the eggs fall under the force of gravity onto a discharge conveyor. This apparatus too, however, relies substantially on a separate power source to eject of the eggs from the conveyor.

It should, therefore, be appreciated that there has existed a definite need for a conveyor discharge apparatus, and a related method of operation, which eliminates the need for separate, massive power sources for ejecting articles from selected locations along the conveyor and avoids damage to the articles otherwise caused by the ejection process.

SUMMARY OF THE INVENTION

The present invention, which addresses this need, is embodied in a conveyor discharge apparatus having an ejection mechanism that is configured in such a way that the power required to eject articles carried by a conveyor of the apparatus is provided substantially by a motor that advances the conveyor. As each article is carried by the conveyor, the ejection mechanism selectively lifts and thereby ejects each article from the conveyor by relying substantially on the power of the motor. The apparatus thus is substantially less expensive to construct and operate.

More particularly, the conveyor discharge apparatus of the present invention includes a conveyor having a plurality of pockets, which are each adapted to carry a separate article, a motor for advancing the conveyor and an ejection mechanism for selectively ejecting articles carried by the pockets. The conveyor can have a series of transversely oriented rollers that are spaced apart from each other and define a separate pocket between each successive pair of rollers. The ejection mechanism includes a plurality of ejection fingers, each of which is associated with a separate one of the pockets. Each finger is selectively movable, substantially only under the power of the motor, from a rest position to an ejection position and, in doing so, lifts and ejects any article carried within its associated pocket.

In more detailed aspects of the invention, the rollers of the conveyor are connected together by a chain that rides along a rail. Further, the ejection mechanism includes a fixed cam located adjacent the conveyor and a plurality of cam followers, each connected to the conveyor and associated with a separate one of the fingers. Each cam follower also is pivotable along with its associated finger, between a rest position in which the cam follower is not engagable with the cam and an ejection position in which the cam follower is engagable with the cam. Moreover, each finger and associated cam follower is elongated and has intersecting longitudinal axes that form an obtuse angle.

In one preferred form of the invention, the ejection mechanism includes a plurality of ejection guiding brackets which are each secured to the conveyor and pinned to a separate ejection finger and associated cam follower. Each bracket has a rectangular base having a pivot side and an oppositely disposed chain side. The pivot side has a boss for arresting movement of the finger and cam follower as they traverse their respective ejection positions. The boss further defines first and second tiered bores, either of which pivotally receives the bracket pin. The pivot side can also be suitably dimensioned to maintain the finger and its associated cam follower in their respective rest positions. The chain side defines a rectangular slot flanked by a plurality of protrusions for attaching the bracket to certain of the side plates that comprise the conveyor's chain links.

In still more detailed aspects of the invention, the ejection mechanism further includes a cam engagement initiator for selectively initiating engagement of each of the cam followers with the cam as the conveyor advances each cam follower past the initiator. The initiator includes a solenoid having a cam surface which is selectively movable into a position to deflect a cam follower from its rest position into a deflection position where it is engageable with the cam. The cam surface engages each cam follower by rotating substantially ninety degrees about the solenoid's axis. The cam includes a camming periphery which provides a follower surface along which the cam follower moves upon assuming a deflection position. The camming periphery has upper and central portions which slope outwardly at different acute angles relative to each other in order to facilitate more gentle ejection of the articles from the conveyor. To that end, the acute angle of the upper portion is advantageously, but not necessarily, greater than the acute angle of the central portion. The fixed cam and rail also define a channel through which each of the cam followers passes when in its rest position, as the conveyor is advanced by the motor. Conversely, each cam follower travels along the convex outer periphery of the plate when in its deflection position.

In operation, the articles are individually carried in the successive pockets of the advancing conveyor. At selected points in the advancement of the conveyor, each finger is moved from its rest position to its ejection position so as to lift and thereby eject the article carried by the overlying pocket.

Other features and advantages of the present invention will become apparent from the following description of the preferred embodiments, taken in conjunction with the accompanying drawings, which illustrate, by way of example, the principles of the invention.

BRIEF DESCRIPTION OF THE DRAWINGS

In the accompanying, illustrative drawings:

FIG. 1 is a perspective view of a conveyor discharge apparatus of the invention with underlying cross-conveyors and attached chute.

FIG. 2 is a cross-sectional view of a first ejection mechanism embodiment for the conveyor discharge apparatus, taken substantially along the lines 2—2 in FIG. 1, and showing a cam engagement initiator, and an ejection finger and its associated cam follower attached to an ejection guiding bracket, with broken lines showing the progressive positions of the initiator, finger, and cam follower, as they move from their rest positions to their ejection positions.

FIG. 3 is a fragmentary top plan view of the first ejection mechanism embodiment of the conveyor discharge apparatus, taken substantially along the 3—3 in FIG. 2, with broken lines showing the substantially ninety degree rotation of the cam surface of the cam engagement initiator.

FIG. 4 is an enlarged fragmentary side view of the first ejection mechanism embodiment of the conveyor discharge apparatus, taken substantially along the lines 4—4 in FIG. 3.

FIG. 5A is an enlarged fragmentary plan view of the cam engagement initiator and its associated fixed cam, taken substantially along the lines 5A—5A in FIG. 2, with broken lines showing the rotation of the cam surface of the initiator into a position suitable for deflecting a cam follower from its rest position.

FIG. 5B is an enlarged fragmentary side view of the cam engagement initiator and its associated fixed cam, taken substantially along the lines 5B—5B in FIG. 5A.

FIG. 6 is a cross-sectional perspective view a chain bracket, attached to the upper rail of the conveyor discharge apparatus.

FIG. 7 is an enlarged, top plan view of the first ejection mechanism embodiment of FIG. 2, showing the ejection finger attached to the ejection guiding bracket.

FIG. 8 is an enlarged, side view of the first ejection mechanism embodiment of FIG. 7, showing the ejection finger and its associated cam follower attached to the ejection guiding bracket.

FIG. 9 is a cross-sectional view of the bottom portion of the cam follower of the first ejection mechanism embodiment, taken substantially along the lines 9—9 in FIG. 8.

FIG. 10 is an enlarged, perspective view of the ejection guiding bracket of the first ejection mechanism embodiment of FIG. 2.

DESCRIPTION OF THE PREFERRED EMBODIMENTS

With reference now to the exemplary drawings, and particularly to FIG. 1, there is shown a conveyor discharge apparatus 10 which receives articles 12 one at a time from a chute 14 and selectively ejects the articles onto a series of underlying cross-conveyors 16. The chute and cross-conveyors are arranged to accommodate a right-to-left advancement of articles along the apparatus. For this purpose, the chute is connected to the right end of the apparatus and inclined relative to it Moreover, the cross-conveyors (only two of which and a portion of a third are shown in FIG. 1) are arranged in rows beginning adjacent the left end of the apparatus. Typically, between four and twelve cross-conveyors are employed.

The apparatus 10 includes a conveyor 22, a motor 24 for advancing the conveyor and a grading and sorting control unit 26. The conveyor transports the articles one-by-one through the control unit, which individually evaluates the articles, and thereafter deposits them onto selected cross-conveyors 16. Columns 28 and 30 support the opposite ends of upper and lower tiered rails 32 and 34 that are connected to each other by struts 36. Conveyor belt gears 38 and 40 respectively are rotatably mounted near the tops of the respective columns 28 and 30.

The upper and lower rails 32 and 34 preferably are channel shaped, with the upper rail having a bottom 42 and two opposite sides 44 and 46. The rails receive a series of transversely-oriented rollers 48 (see FIGS. 2-4). Each of the rollers is rotatably mounted on a separate roller shaft 50 having each of its ends attached to a separate one of a pair of oppositely disposed chains 52 and 54 so as together form conveyor belt 56 (see FIGS. 1 and 3-4). The rollers are also sufficiently spaced apart from one another and define a series of pockets 58, each adapted to carry a separate one of the articles 12.

As shown in FIGS. 1-3, each chain 52 and 54 is adapted to sit on a separate one of the opposite sides 44 and 46 of the upper rail 32. The chains can also sit similarly on opposite sides of the lower rail 34. This provides desirable tautness to the conveyor belt 56 and ensures that the pockets 58 are of appropriate depth to accommodate the articles 12. The chains are advantageously of the conveyor side plate silhouette type. They each have alternating pairs of oppositely disposed side plates 59 and 60 that define a series of chain links. Each pair of plates 59 and 60 has centrally disposed apertures 61 for receiving the roller shaft 50. When assembled, each link defined by a given pair of plates 59 is somewhat wider in horizontal cross-section than each link defined by a given pair of the plates 60. (See, FIG. 3)

Each opposite longitudinal end of the conveyor belt is connected to a separate one of the conveyor belt gears 38 and 40. Under the power of the motor 24, the conveyor belt gears actuate the conveyor belt in a counterclockwise direction. The pockets thereby move along with the conveyor belt in a counterclockwise direction.

The motor 24 is mounted on the column 28 and is operably connected to a suitable conveyor drive mechanism 66 which transfers the power of the motor to the conveyor 22 so as to advance the conveyor. The drive mechanism includes a drive belt 68 which wraps around oppositely disposed drive and conveyor gears 70 and 72 that are coupled to the motor and conveyor belt gear 38 respectively.

In accordance with the invention, the apparatus 10 includes an ejection mechanism 76 for selectively ejecting the articles 12. The mechanism is configured in such a way that the power required to lift and thereby eject any article carried by any of the pockets 58 is provided substantially by the motor 24 via the advancing conveyor 22. The apparatus thus is substantially less expensive to construct and operate in that it does not substantially rely on a power source separate from, and in addition to, the motor 24 to eject articles from the conveyor. The mechanism further imparts a more gentle, rather than overly sudden and excessive, force to the articles. It, therefore, tends to minimize damage to the articles which the ejection process may otherwise cause.

In one embodiment, the ejection mechanism 76 includes a plurality of ejection fingers 78 with associated cam followers 80 and ejection guiding brackets 82, and a series of fixed cams 84 with associated cam engagement initiators 86 (see FIGS. 2 and 3-10. For ease of discussion, FIGS. 2, 5A, 5B and 7-10 show only one finger and its associated cam follower and guiding bracket and only one fixed cam and initiator.) As more fully described below, each finger and its companion cam follower and bracket occupy a separate one of the pockets 58. On the other hand, each fixed cam and its associated initiator are situated above a separate one of the underlying cross-conveyors 16. Each finger and cam follower cooperate together with the fixed cams and initiators so as to lift and thereby eject articles from their corresponding pockets 58 directly onto an appropriate one of the cross-conveyors 16.

As best shown in FIGS. 7 and 8, each ejection finger 78 and its companion cam follower 80 is advantageously, but not necessarily, a unitary structure formed by a suitable injection molding process. More particularly, each finger is elongated and has a somewhat concave exterior surface 88. The surface is sufficiently wide and rigid to support and properly eject an article 12 carried by the overlying pocket 58. To further facilitate ejection of an article, the cross-section of the surface becomes tapered along the upper portion of the finger. Each cam follower is also elongated but has a somewhat differently configured exterior surface 90 that faces the side 44 of the upper rail 32. That is, the surface 90 is somewhat concave but becomes gently convex along the lower portion of the cam follower and then substantially straight near the bottom 92 of the cam follower. The surface 90 is also sufficiently long and tapered near the bottom 92 so that the engagement initiator 86 can appropriately deflect the cam follower. (see FIGS. 8-9).

The surfaces 90 and 92 of the finger 78 and cam follower 80 respectively merge and define a centrally located passage 94. The passage has a substantially planar bottom 96 with oppositely disposed sidewalls 98 and 100. Each sidewall is rounded along its top edge and has a coaxial aperture (not shown) for securely receiving a bracket pin 102. When secured in this manner, the longitudinal axis of the bracket pin is oriented substantially perpendicular to the elongated sections of the finger and cam follower. As more fully set forth below, the bracket pin is pivotally connected to the chain 52 by the guiding bracket 82, thereby permitting the finger and its companion cam follower to move between their respective rest and ejection positions (see progression of broken lines in FIG. 2).

For the purpose of facilitating proper ejection of the articles 12 from their overlying pockets 58, each ejection finger 78 in its rest position traverses substantially the entire cross-section of its corresponding pocket (see solid lines in FIG. 2). It is also sufficiently pivotable about the longitudinal axis of the bracket pin 102 for the mechanism 76 to properly eject any article 12 from its corresponding pocket onto one of the cross-conveyors 16. On the other hand, in its rest position, each cam follower 80 extends downward within the pocket sufficiently enough for its bottom 92 to be juxtaposed to the initiator 86 at any appropriate point in the advancement of the conveyor 22 (see FIG. 2). It will be observed from the broken lines in FIG. 2 that each finger and cam follower pivot through an acute angle between their respective rest and ejection positions.

Each ejection guiding bracket 82 is preferably created by an appropriate injection molding process. Each bracket further includes a substantially rectangular base 104, which has a chain side 106, a pivot side 108 disposed opposite the chain side, and a boss 110 that is formed integral with a portion of the pivot side 108 (see FIG. 10). The chain side defines a rectangular slot 112 which is flanked by chain sidewalls 114 and 116 that curve somewhat inwardly toward the slot 112. The bracket is connected to the the chain 52 by fitting each chain sidewall over the side plate 59 that is nearest the pocket 58 (see FIGS. 2, 3-4 and 8 which show bracket 82 connected to the side plate 59 of the chain 52.)

For the purpose of more snugly securing each bracket 82 to the chain 52, each chain sidewall 114 and 116 has two separate rectangular protrusions 118 and 120 respectively (see FIGS. 2 and 7-8). The protrusions are disposed opposite each other and are substantially configured like the frustum of a semi-cone with its bevelled side sloping toward the rectangular slot 112. The protrusions also jut out over the rectangular slot and have their respective bevelled sides canted sufficiently that the bracket 82 can firmly clip onto any one of the side plates 59 of the chain 52. (See FIG. 8).

The chain side 106 of each bracket 82 can also define a circular ridge 122 which can fit within any one of the individual apertures in the side plates 59 of the chain 52. (See FIGS. 3-4 and 10) As such, the ridge increases the snugness of the fit between the bracket and the chain to which it is attached. It also tends to stabilize the bracket during operation of the apparatus 16. To that end, each ridge is advantageously symmetrically located relative to the protrusions 118 and 120.

The chain side 106 of the bracket can further define a circular depression 124 formed in the base 104 and located opposite the boss 110. The depression is of depth sufficient to receive a hemispherical cap (not shown) that typically protrudes from the chain links of conveyor side plate silhouette type chains. Moreover, in order to economize on material usage, the pivot and chain sides 106 and 108 of the base 104 can define a rectangular aperture 126 disposed adjacent to each protrusion 118 and 120. The pivot side of the base is advantageously suitably dimensioned such that it substantially, flushly abuts the sidewall 100 when the ejection finger 78 and its companion cam follower 80 occupy their respective rest positions (see FIGS. 7-8). The sidewall thus functions as a stop and ensures that the finger and cam follower occupy their appropriate rest positions.

As shown in FIG. 10, the boss 110 juts outward from the pivot side 108 and has a somewhat "M" shaped cross-section, the lower portion of which defines a somewhat crown-shaped cavity 128 and the upper portion of which defines first and second tiered bores 130 and 132. Each bore occupies a separate one of the humps formed by the upper portion of the "M" shaped cross-section and is adapted to optionally, but pivotally, receive the bracket pin 102. The existence of two separate bores allows the user to attach each finger 78 and its associated cam follower 80 to the chain 52 with a single standardized bracket and at the same time to properly center each finger and cam follower within its pocket 58. As shown in FIG. 3 proper attachment and centering of each finger and cam follower is accomplished with a single standardized bracket by simply alternating the orientation of successive brackets. Thus, each bracket clips over one of the plates 59 and the bracket pins 102 alternate between the first and second bores 130 and 132.

The boss 110 is also advantageously, but not necessarily, suitably dimensioned so that it can arrest the upward or counterclockwise movement of the finger 78 as it traverses its ejection position. It thereby can provide a restoring force that returns the finger from its ejection position to its rest position. More particularly, the planar bottom 96 of the passage 94 abuts with the boss as the finger and its companion cam follower 80 reach their respective ejection positions. It will be appreciated that a number of other forms of brackets can be fashioned which appropriately connect the fingers and cam followers to the chain links of the chain 52 and which appropriately regulate their pivotal movement.

Each cam engagement initiator 86 and its associated fixed cam 84 together regulate the camming action of each cam follower 80 and the corresponding movement of each cam follower and its associated ejection finger 78 between their rest and ejection positions. This allows the mechanism 76 to properly eject the articles 12 from their corresponding pockets 58 and deposit them onto any one of the underlying cross-conveyors 16 as the conveyor 22 advances the cam follower past the initiator 86 associated with each cross-conveyor. More specifically, each initiator is attached by a suitable pair of screws 133 to the side 44 of the upper rail 32 adjacent to the bottom 92 of the follower. Each initiator further includes a cam surface 134 which is pivotally connected to a solenoid 136 that controls the movement of the cam surface (see FIGS. 2 and 5A-5B).

As depicted in FIG. 5B, each initiator is also slidable with its associated fixed cam along an elongated slot 138 formed in the upper rail by loosening screws 133. This feature permits the user to compensate for a phenomenon known as "chain stretch" and to fine tune the position of the initiator and fixed cam so that articles are ejected onto the appropriate cross-conveyor 16 in a timely fashion. A suitable separate, chain bracket 133a can also be attached to the side 44 of the upper rail above said cross-conveyor 16 and adjacent to each fixed cam. The chain bracket surrounds the chain 52, and restrains it from moving off of the upper rail during the ejection process. It is also specifically configured so that it will tend to prevent the chain 52 from striking any articles whose ejection trajectory may otherwise cause articles 12 to pass into the path of the chain 52.

Each cam surface 134 is pivotable approximately ninety degrees about the longitudinal axis of its corresponding solenoid 136 between rest and deflection positions (see FIGS. 2 and 5B where solid lines correspond to the rest position and broken lines to the deflection position of the cam surface). For that reason, the elongated slot 138 formed in the upper rail 32 is sufficiently dimensioned to permit the aforementioned movement. In its rest position, the cam surface does not protrude within the upper rail enough to obstruct any of the cam followers 80 as they are carried by the advancing conveyor 22. (See FIGS. 5A-5B). However, in the deflection position, the cam surface has rotated substantially ninety degrees into a position where it can deflect any one of the cam followers. (See dotted lines in FIG. 2).

For the purpose of easing the deflection of each cam follower 80, each cam surface 134 is somewhat rhomboid, except for one side that is concave so as to be pivotally attachable to the solenoid 136 (see FIGS. 3 and 5A). Therefore, when the cam surface assumes its deflection position, deflection of the cam follower occurs along a side of the cam surface which slopes outwardly into the interior of the upper rail 32. As shown by the initial set of broken lines in FIG. 2, the ejection finger 78 and its companion cam follower are deflected into their respective deflection position by moving in a counterclockwise direction.

Each solenoid 136 is preferably of the rotary type and is selectively energizeable by electrical signals received from the control unit 26 in a well-known manner, such as that described in U.S. Pat. No. 4,246,098 to Conway et al. patent. This patent is incorporated by this reference and has previously been assigned to the assignee of the present invention. When the solenoid is in a non-energized state, its associated cam surface 134 maintains its rest position. Each cam follower 80, therefore, passes freely without impacting the cam surface. However, when the solenoid is energized, the cam surface pivots into its deflection position and deflects any cam follower contacting its surface.

Each fixed cam 84 is secured near the bottom of the upper rail 32 by screws 133 and has a predetermined configuration and location relative to its associated initiator 86 so as to provide the requisite camming action for guiding each follower 80 successively between its deflection, ejection and rest positions. To that end, each fixed cam has a horizontal cross-section which defines a particular camming periphery 140 that facilitates more gentle ejection of articles 12 from the conveyor 22. As shown in FIG. 5A, the upper portion of the camming periphery slopes outwardly at an acute angle while its lower portion is substantially straight and parallel to the longitudinal axis of the upper rail 32. (See FIG. 5A) The central portion of the camming periphery slopes outwardly at somewhat less of an acute angle than the upper portion.

The upper and central portions advantageously, but not necessarily, are at angles of about 40 and 33 degrees respectively relative to the longitudinal axis of the upper rail. (See, FIG. 5A) It will be appreciated that the particular angles associated with the upper and lower portions can be selected so that the ejection mechanism is particularly suitable to eject articles of a certain configuration. Thus, smaller articles (e.g., small fruit, such as lemons) tend to be oriented lower in the pockets 58 and may require a more rapid impartation of momentum to the ejection mechanism for proper trajectory of ejection. On the other hand, larger articles (e.g. fruit, such as oranges) tend to be oriented higher in the pockets and may require a more rapid initial impartation of momentum to the ejection mechanism so that the ejection mechanism can properly begin to lift the article.

The camming periphery 140 of the the fixed cam 80, therefore, provides a follower surface along which the cam follower begins to move upon assuming its deflection position. That is, upon being deflected to its deflection position by the cam surface 134, the cam follower under the power of the motor 24 advancing the conveyor 22 slides successively along the upper, central and lower portions of the camming periphery. Upon conclusion of its camming action along the central portion, the cam follower assumes its ejection position (see second set of broken lines in FIG. 2) and then slides along the lower portion back to its rest position. (See, FIG. 5A)

Each fixed cam 84 also has a vertical cross-section which has a substantially planar bottom that is contained between a side that is flush with the side 44 of the upper rail and a side oriented at an acute angle relative to the bottom of the rail. Thus, the fixed cam and upper rail together define a channel 146 through which each cam follower 80 freely passes when it is in its rest position. The fixed cam is also configured so that its camming periphery 140 is sufficiently contiguous with the cam surface 134 once the solenoid 136 has pivoted the cam surface into its deflection position. It will be appreciated that the fixed cam can have any configuration and location which suitably deflects the cam follower and provides the requisite camming action between the fixed cam and the cam follower.

The operation of the conveyor discharge apparatus 10 will now be discussed with particular reference to the first embodiment of the invention. Preliminarily, the control unit 26 and the cross-conveyors 16 are activated, and the motor 24 is turned on so that the conveyor 22 begins to advance. Subsequently, articles 12 begin to travel down the chute 14 and are successively carried with a separate one of the pockets 58 of the advancing conveyor. Each finger 78 and its associated cam follower 80 is similarly carried along in its corresponding pocket by the advancing conveyor.

As the conveyor 22 continues to advance, the articles 12 successively pass through the control unit 26. The unit appropriately analyzes each article, determines on which of the cross-conveyors 16 each article should be deposited, and controls the initiators 86 so as to ensure that each article is deposited at the appropriate point of advancement of the conveyor. By way of example, a control unit such as that described in the Conway et al. patent would grade fruit articles according to size, surface blemish and surface color. The unit would then analyze the particular data obtained for each fruit article, assign a grade to the individual fruit article, and transmit an electrical signal to the appropriate initiator. Thus, for instance, a signal corresponding to a "Grade A" fruit would be transmitted to the particular initiator located adjacent the "Grade A" cross-conveyor. It will be observed (see FIG. 1) that the unit is connected to the upper rail 32 upstream of the cross-conveyors and has an opening 156 sized sufficiently to allow the articles to pass through the unit. It will further be appreciated that the fruit would preferably be appropriately rotated and oriented within the pockets 58 in a well-known manner before entering the control unit.

The electrical signal from the control unit 26 then energizes the solenoid 136 of the appropriate initiator 86, thereby pivoting the cam surface 134 into its deflection position where it obstructs the channel 146. Then, the cam surface deflects the cam follower 80 which has continued to be carried along by the advancing conveyor 22. Concurrently, its associated ejection finger 78 moves upward or counterclockwise substantially in unison with the cam follower. The finger 78 thus begins to lift out of the pocket any article 12 carried within its associated pocket. It will be appreciated that the unit appropriately delays activation of the initiator until the article carried by its corresponding pocket has advanced to a position suitable to be deposited onto the proper one of the cross-conveyors 16.

The cam surface 134 deflects the cam follower 80 sufficiently for camming action to be initiated between the cam follower and the fixed cam 84. The cam follower then engages the fixed cam and moves to its ejection position and back to its rest position as previously described. Correspondingly, its companion ejection finger 78 moves to its ejection position and returns to its rest position substantially in unison with the cam follower. Thus, as the finger reaches its ejection position its lifting force propels the article 12 out of its corresponding pocket 58. The article is deposited onto the proper one of the cross-conveyors 16. It will be observed that the above described procedure repeats itself once the initiator 86 receives another electrical signal from the control unit 26.

It should be appreciated from the foregoing description that the present invention provides a conveyor discharge apparatus that can lift and thereby eject any article carried by the conveyor of the apparatus through substantially relying on the motor that advances the conveyor. The apparatus lack of any need to substantially rely on separate, massive power sources to eject articles, therefore, makes it substantially less expensive to construct and operate. Its employment of a more gentle, rather than overly sudden and excessive, force to eject articles also tends to minimize damage to the articles. The apparatus includes an ejection mechanism having a plurality of ejection fingers that are each associated with a separate one of the pockets of a conveyor and are selectively movable from a rest position to an ejection position so as to lift articles carried within the pocket in which the particular finger is located. The ejection mechanism is further configured such that the power required to lift and eject any article from any of the pockets is provided substantially by the motor that advances the conveyor. Each finger can also have an associated cam follower that moves substantially in unison and cooperates with its companion finger to lift and eject articles individually from the conveyor. Like each finger, each associated follower is selectively movable between rest and ejection positions and vice versa substantially under the power of the motor.

Although the invention has been described in detail with reference to the presently preferred embodiments, it will be appreciated by those skilled in the art that various modifications can be made without departing from the spirit and scope of the invention. Accordingly, the scope of present invention is not to be limited by the particular embodiments above but is to be defined only by the claims set forth below and equivalents thereof.

I claim:

1. A conveyor discharge apparatus, comprising:
   a conveyor having a series of transversely-oriented, rotatable rollers spaced apart from each other so as to define a separate pocket between each successive pair of said rollers, each of said pockets being adapted to carry and orient a separate article, said conveyor further including a pair of oppositely disposed chains with chain links;
   motor means for advancing said conveyor; and
   ejector means for ejecting any articles carried by said pockets, said ejector means being connected to said conveyor and including a plurality of ejection fingers, each being associated with a separate one of said pockets and being selectively movable through its associated pocket from a rest position to an ejection position so as to lift and thereby eject articles carried by the pocket in which it is located, said ejector means further including,
(a) a cam located adjacent said conveyor,
(b) a plurality of cam followers, each being associated with a separate one of said pockets of said conveyor and being movable along with its associated ejection finger between a rest position in which said cam follower is not engageable with said cam and an ejection position in which said cam follower is engageable with said cam, and
(c) a plurality of ejection guiding brackets, each being secured to said conveyor and to a separate one of said ejection fingers and its associated cam follower and having a rectangular base with a pivot side that has a boss for arresting movement of said finger and follower as they traverse their respective ejection positions,
  (i) said boss defining first and second tiered bores for optionally and rotatably receiving its corresponding bracket pin, and
  (ii) said rectangular base of each of said brackets having a chain side that defines a rectangular slot with opposing sidewalls having a plurality of oppositely disposed protrusions for attaching said bracket to any one of the chain links of said chains,
(d) a plurality of bracket pins, each being secured to a separate one of said fingers and its associated cam follower;
wherein said ejector means is configured such that the power required to lift and eject any article from any of said pockets is provided substantially by said motor means via said advancing conveyor.

2. A conveyor discharge apparatus, comprising:
a conveyor having a series of transversely-oriented rollers rotatably mounted to a pair of oppositely disposed movable chains with chain links, said rollers further being spaced apart from each other so as to define a separate pocket situated between each successive pair of said rollers, each of said pockets being adapted to carry and orient a separate article and being carried along by said chains;
ejector means for ejecting any articles received by said pockets, said ejector means being connected to said conveyor and including,
(a) a plurality of ejection fingers, each being associated with a separate one of said pockets and being selectively movable through its associated pocket from a rest position to an ejection position in which any article carried by the corresponding pocket in which it is located is ejected by said ejection finger,
(b) a cam located adjacent said conveyor,
(c) a plurality of cam followers, each being associated with a separate one of said pockets of said conveyor, and being connected to said conveyor and being movable along with its associated ejection finger between a rest position in which said cam follower is not engageable with said cam and an ejection position in which said cam follower is engageable with said cam,
(d) means for selectively initiating engagement of each of said cam followers with said cam as said conveyor advances each of said cam followers past said means for selectively initiating engagement, said means for selectively initiating engagement being located adjacent said conveyor and being selectively slidable together with said cam longitudinally along said conveyor, and
(e) a plurality of ejection guiding brackets, each being secured to said conveyor and to a separate one of said ejection fingers and its associated cam follower and having a rectangular base with a pivot side that has a boss for arresting movement of said finger and follower as they traverse their respective ejection positions,
  (i) said boss defining first and second tiered bores for optionally and rotatably receiving its corresponding bracket pin, and
  (ii) said rectangular base of each of said brackets having a chain side that defines a rectangular slot with opposing sidewalls having a plurality of oppositely disposed protrusions for attaching said bracket to any one of said chains,
(f) a plurality of bracket pins, each being secured to a separate one of said fingers and its associated cam follower; and
motor means for advancing said conveyor such that the power required to lift and eject any article from any of said pockets is provided substantially by said motor means via advancing said conveyor.

* * * * *